Sept. 26, 1967    H. BEIK    3,343,504
APPARATUS FOR PLACING PASTRIES IN PAIRS
ONE ON TOP OF THE OTHER
Filed June 15, 1965    3 Sheets-Sheet 1
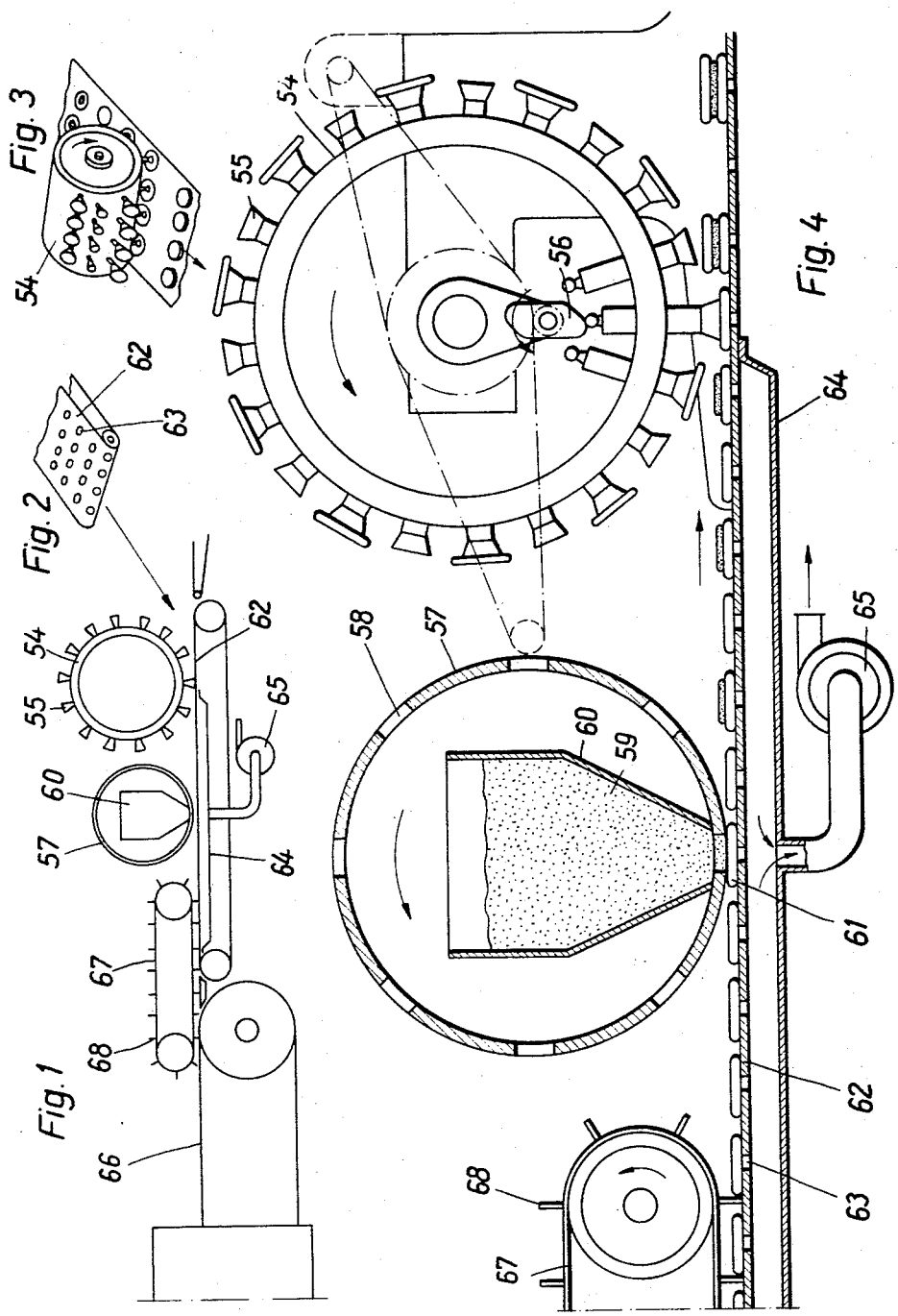

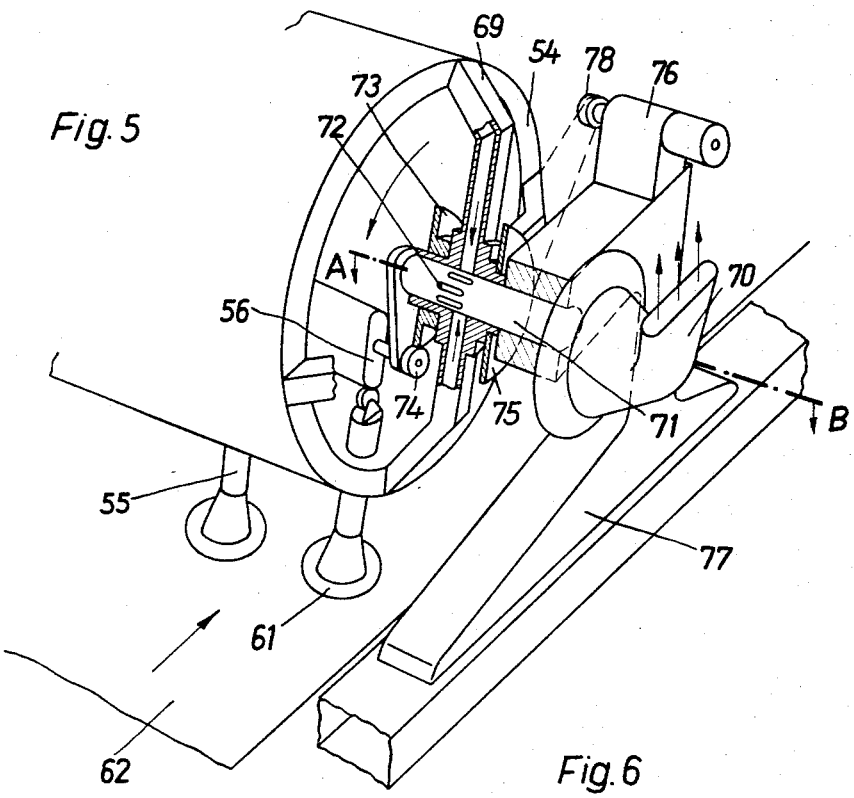
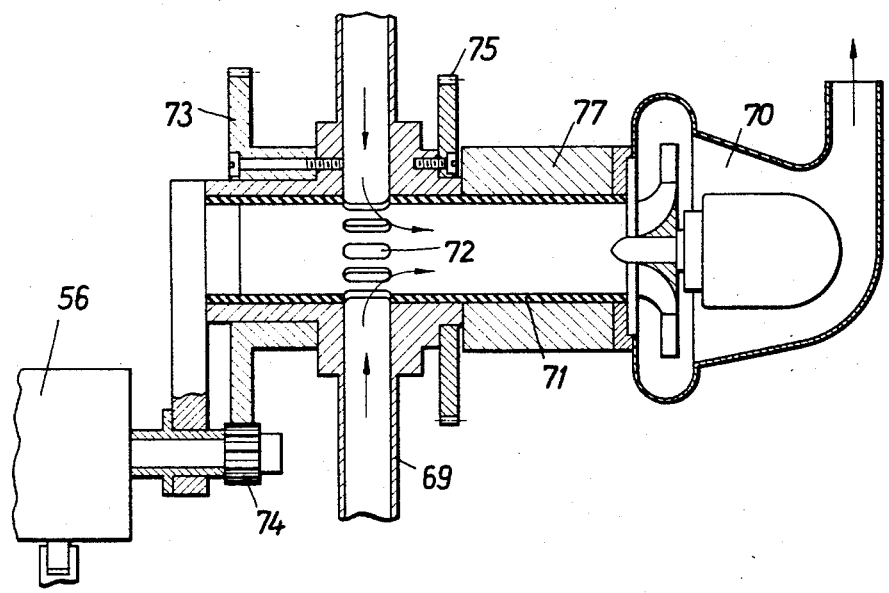

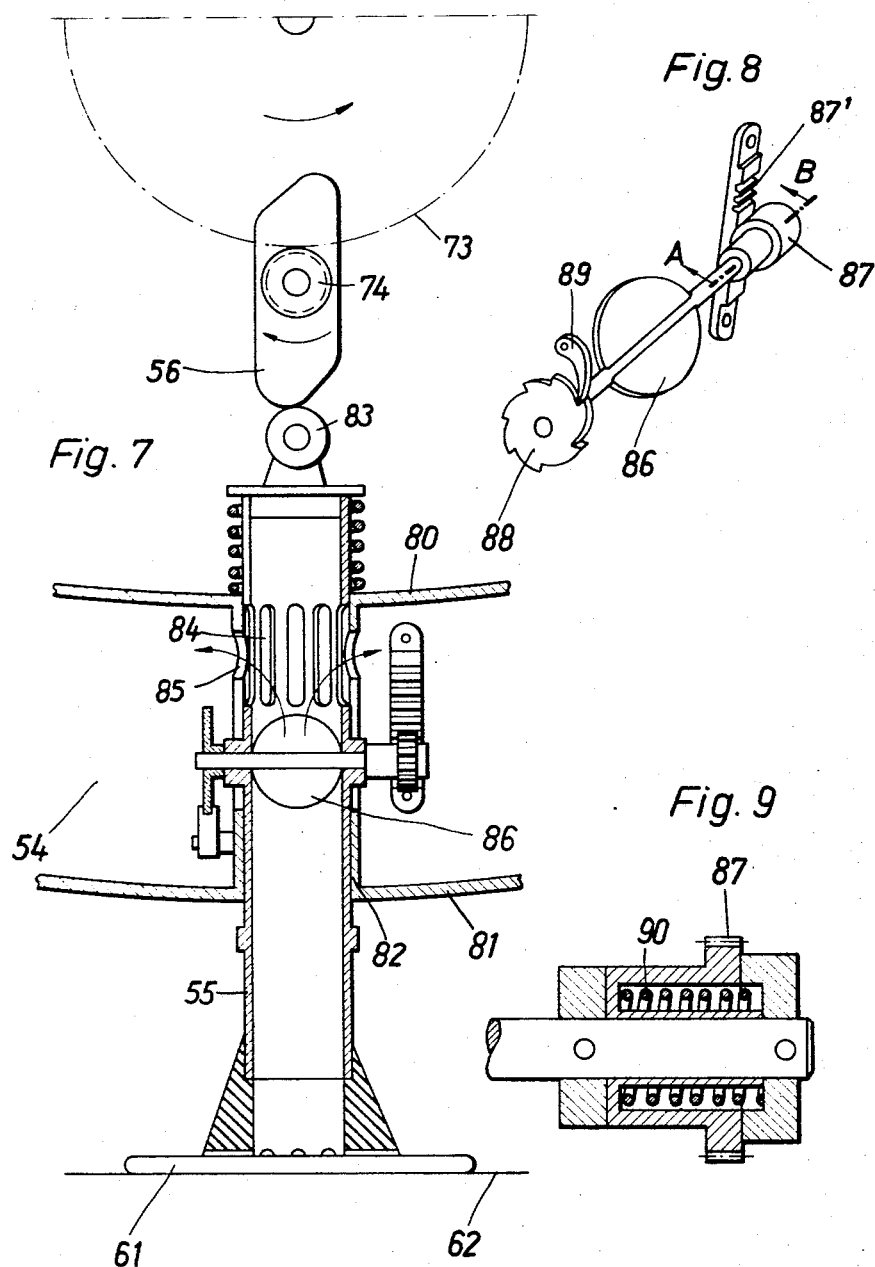

United States Patent Office 3,343,504
Patented Sept. 26, 1967

3,343,504
APPARATUS FOR PLACING PASTRIES IN PAIRS ONE ON TOP OF THE OTHER
Hermann Beik, Hannover, Germany, assignor to Werner Bahlsen, Hannover, Germany
Filed June 15, 1965, Ser. No. 464,051
Claims priority, application Germany, June 23, 1964, B 77,378
12 Claims. (Cl. 107—1)

This invention relates to an apparatus whereby a pair of cake elements are brought into superposed relationship, such cake elements being carried in uniform sequence on a conveyor, more particularly on an oven belt or conveyor belt coming from an oven.

In prior art methods of topping cakes or the like, cake elements are stacked in magazines, withdrawn singly from the same, and treated in the topping station. This method requires very uniform or large pieces of pastry or the like.

It is also known to connect such magazine-type topping devices to an oven belt or similar continuous conveyor. In such cases, two or four overlapping rows of cake elements are stored in magazines, from which they are withdrawn, taken beneath the cream applicator, have cream applied and are then topped, all these operations being carried out at high speed. This method entails a relatively high speed of operation of the mechanical parts of the topping mechanism, so that this method is unusable where the creams used are of relatively thick consistency.

The object of the invention is to provide a topping device which is of simpler construction than the prior art magazine-type topping devices and which while giving the same overall output make use of topping components operating at lower speeds.

To this end, according to the invention, substantially radially extending suction nozzles are disposed on a rotatable drum whose axis extends transversely of the conveyor, there being an odd number of nozzles per periphery and the nozzle spacing in the peripheral direction corresponding substantially to the spacing of the cake elements, and the rotation of the drum is so controlled in synchronism with the movement of the conveyor that the suction nozzles are lowered onto the cake elements on the conveyor in the zone of the nozzle rotation nearest the conveyor and suction is applied to the nozzles only on every other revolution. Suction is applied to each empty nozzle lowered onto a cake element so that the nozzles lift the cake element and retain it during the next revolution. It then descends together with the cake element onto the conveyor, where it encounters another cake element which, for example, has already had cream applied to it. The first cake element is then deposited on the second element. The suction is then stopped so that the empty nozzle then lifts away from the pair of superposed cake elements, ready for the next revolution. The nozzles are so controlled that every other nozzle picks up a cake element from the conveyor, carries it through one revolution, and places it on another cake element on the conveyor, when it next reaches the conveyor. Accordingly, this nozzle performs one revolution without a cake element and without being connected to the suction source, until it meets a cake element in its next bottom position, such cake element being taken up and placed on another bottom element after one revolution.

The drum is advantageously of the same width as the oven belt and the nozzles are disposed transversely of the direction of conveyance in exactly the same way as the cake elements are disposed on the conveyor. To ensure that the nozzles can adjust to the different heights of the topped and untopped cakes and reach the cake elements before the theoretical dead-centre point of their revolution and lift up again after such dead-centre point, they are radially movable according to another feature of the invention. According to the invention, they may also be peripherally movable and be so controlled in respect of their movement that in the zone of rotation adjacent the conveyor they move in exact synchronism with the conveyor and the cake elements thereon.

Further details of the invention will be apparent from the following detailed explanation of an embodiment of the invention with reference to the accompanying drawings, wherein:

FIGURE 1 is a schematic diagram for continuous pastry topping;
FIGURE 2 shows the arrangement of the cake element on the conveyor belt;
FIGURE 3 is a perspective view of the arrangement of suction nozzles on a cylinder;
FIGURE 4 is an enlarged-scale view of the apparatus according to FIGURE 1;
FIGURE 5 is a perspective side elevation of the nozzle cylinder in partial section;
FIGURE 6 is a section on AB in FIGURE 5;
FIGURE 7 is a section through the suction nozzle unit;
FIGURE 8 shows the arrangement of the suction nozzle air valve; and
FIGURE 9 is a section on AB in FIGURE 8.

The parts of the system according to the invention move at relatively low speeds, 18 to 30 cakes being topped simultaneously depending upon the cake diameter and oven belt width (for oven belt widths of 1–1.2 metres for example).

Further advantages will be apparent from the following example of embodiment.

Drum ovens employing steel belts are generally used in the industrial manufacture of cakes and pastry. The raw cake dough is shaped upstream of the oven and conveyed by suitable means to the steel oven belt (see FIGURE 1). The cakes are cooked as they travel through the drum oven.

For the manufacture of sandwich-type cakes, which consist for example of two identical pieces of pastry or the like with a cream filling between them cream is applied alternately to every other row of cake elements on the oven belt. Provided that the sequence of cakes is maintained, this can of course also be done after the oven belt. In such cases the rows of cakes would be moved, for example, by means of an aligning strip from the oven belt onto a following conveyor belt to maintain the sequence.

According to the invention, a continuous movement is provided. To this end, suction nozzles are disposed on a rotating cylinder 54 (FIGURES 1–4). There is an odd number of suction nozzles 55 on the cylinder 54 and their pitch corresponds substantially to the spacing between the cakes on the belt. While one nozzle is lifting a cake element from the belt, the next nozzle is depositing its cake element onto another cake element on the belt. The nozzles are also arranged so as to be at least radially movable.

The different movements during the picking up of a cake element by suction and during the topping operation are controlled by a cam strip 56 which moves in rhythm with the pitch.

A cream applicator 57 formed with apertures 58 is advantageously used to apply the cream. The cream 59 is disposed in a container 60 inside the applicator drum. As the latter rotates, one aperture 58 comes beneath the cream container and fills with cream, which sticks to the cake element 61 as it moves on. To prevent the cake elements 61 from adhering to the applicator drum, the conveyor belt 62 is formed with apertures 63 through which the cake elements are held on the conveyor belt 62 by suction.

Suction is produced by a fan 65 in a trough 64 beneath the conveyor belt 62. To ensure that the cake elements are transferred from oven belt 66 to conveyor belt 62 in the correct positions above the apertures 63, a rotating alignment device is provided above the oven belt 66 and the conveyor belt 62.

This device comprises pins or strips 68 spaced by distances corresponding to the distances between the apertures on the conveyor belt 62 and the distance between the suction between the suction nozzles.

The cylinder drum 54, cream drum 57, aligning device 67 and conveyor belt 62 are advantageously driven synchronously.

In the nozzles, the suction is applied via hollow arms 69 and is produced by the fan 70 (FIGURES 5 and 6). The fan is disposed on a stationary hollow shaft 71. The shaft has air apertures 72 leading to the hollow arms 69 to enable the air to be evacuated from them.

The cam strip 56 is driven via a gear 73/74. The entire unit can be driven via the pulley 75 and wheel 78 from the geared motor 76 mounted on the bracket 77.

The cylinder 54 consists of an inner cylinder 80 and an outer cylinder 81 (FIGURE 7) between which the suction passes. The individual suction nozzles are moved radially in guides 82 through the agency of the cam strip 56 via the cam follower 83. The cylinder 82 and the suction nozzle tube are formed with air apertures 84 and 85 between the cylinder 80 and 81, the suction passing through such apertures. The suction is switched off or on through the agency of the pivotable air flap 86. To this end, a rack drive 87 (FIGURE 8) is provided in part 54 and is so dimensioned that the flap 86 is brought into the closed or open position on each operative movement of the suction nozzle. The flap 86 is prevented from pivoting back by means of the pawl 89 and ratchet wheel 88. A spring escapement 90 for reverse is provided for the drive 87 (FIGURE 9).

The cake elements can of course be fed from the oven belt 66 to the conveyor belt 62 in a different way from that shown in FIGURES 1 to 4. For example, a rake or similar element could be used. It would also be possible to use different cream applicators, depending upon the type and consistency of the cream. The method could also be used for lifting tablets or the like; it is not restricted to cakes or pastry.

What is claimed is:

1. In an apparatus for bringing a pair of cake elements into superposed relationship, such cake elements being carried in uniform sequence on a conveyor, more particularly on a conveyor belt coming from an oven, the improvement comprising substantially radially extending suction nozzles disposed on a rotatable drum whose axis extends transversely of the conveyor, there being an odd number of nozzles around the periphery of the drum and the nozzle spacing in the peripheral direction corresponding substantially to the spacing of the cake elements across the conveyor, and means effecting rotation of the drum in synchronism with the movement of the conveyor that the suction nozzles are lowered onto the cake elements on the conveyor in the zone of the nozzle rotation nearest the conveyor and means for applying suction to each of the nozzles only during every other revolution, while the immediately preceding and following nozzles are disconnected from said suction applying means.

2. The apparatus according to claim 1, characterised in that the drum has a width equal to the width of the conveyor and the nozzles are disposed transversely of the conveyor direction in the same sequence as the cake elements on the conveyor.

3. Apparatus according to claim 2, characterised in that the conveyor and the drum are continuously driven in synchronism.

4. Apparatus according to claim 3, characterised in that the nozzles are radially movable.

5. Apparatus according to claim 4, characterised in that the nozzles are mounted on the drum in radial guides and control means for moving the nozzles are provided in side the drum.

6. Apparatus according to claim 5, characterised in that the control means consist of a rotating cam shaft situated eccentrically in the bottom of the drum.

7. Apparatus according to claim 6, characterised in that the cam shaft performs a half-revolution per nozzle and is provided with two camming projections, the difference in height of which corresponds to the difference in height between the topped cakes and the untopped cakes.

8. Apparatus according to claim 5, characterised in that the drum is of double-walled construction and is provided with a suction connection to the space between the two walls, such connection communicating with the nozzles via apertures in the wall of the nozzle tubes.

9. Apparatus according to claim 8, characterised by a valve connected to the nozzle tube by a ratchet mechanism as a driving means drivable by relative movement of the nozzle tube with respect to the drum.

10. Apparatus according to any of claim 9, characterised in that a cream applicator device applying cream to every other transverse row of cake elements is provided ahead of the nozzle drum.

11. Apparatus according to claim 10, characterised in that the cream applicator device consists of a hollow cylinder driven in synchronism with the conveyor for the cake elements and formed with apertures at a pitch corresponding to the pitch of the cake elements, and a cream container co-operating with whichever aperture is at the bottom, the pitch of the apertures in the peripheral direction being twice the pitch of the cake elements on the conveyor.

12. Apparatus according to claim 11, characterised in that the conveyor consists of a conveyor belt which at the places associated with the cake elements is formed with apertures and a suction chamber is formed beneath the belt at least in the zone of the cream applicator device.

References Cited

UNITED STATES PATENTS

| | | | |
|---|---|---|---|
| Re. 25,072 | 10/1961 | Monaco | 107—1 |
| 2,817,306 | 12/1957 | Oakes | 107—1 |
| 2,868,141 | 1/1959 | Griner | 107—45 X |
| 3,300,063 | 1/1967 | Jensen et al. | 214—1 |

WALTER A. SCHEEL, *Primary Examiner.*

A. O. HENDERSON, *Assistant Examiner.*